US007456386B2

(12) United States Patent  (10) Patent No.: US 7,456,386 B2
Rehmann  (45) Date of Patent: Nov. 25, 2008

(54) AVERAGING SIGNALS

(75) Inventor: David A. Rehmann, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 446 days.

(21) Appl. No.: 11/242,313

(22) Filed: Oct. 3, 2005

(65) Prior Publication Data

US 2007/0075231 A1   Apr. 5, 2007

(51) Int. Cl.
 *G01D 5/34* (2006.01)
(52) U.S. Cl. .................................. 250/231.13; 341/13
(58) Field of Classification Search ..............................
      250/231.13–231.14, 231.16–231.18; 341/11,
                                                   341/13
      See application file for complete search history.

(56) References Cited

U.S. PATENT DOCUMENTS

| 5,557,440 | A | 9/1996 | Hanson et al. |
| 5,598,201 | A | 1/1997 | Stodder et al. |
| 5,774,074 | A | 6/1998 | Cooper et al. |
| 5,801,762 | A | 9/1998 | Dianna et al. |
| 6,215,119 | B1 | 4/2001 | Markham et al. |
| 6,330,424 | B1 | 12/2001 | Chapman et al. |
| 6,639,207 | B2 * | 10/2003 | Yamamoto et al. ..... 250/231.14 |
| 6,830,399 | B2 | 12/2004 | Adkins et al. |

\* cited by examiner

*Primary Examiner*—Kevin Pyo

(57) ABSTRACT

A method for compensating for encoder wheel eccentricity includes routing encoding module signals to a signal logic module when an encoder wheel is not at slew, averaging the encoding module signals, by using the signal logic module, to form averaged signals, when the encoder wheel is at slew, and generating an output signal from the averaged signals and the encoding module signals, by using the signal logic module.

21 Claims, 6 Drawing Sheets

AVERAGING SIGNALS

BACKGROUND

A radial array of encoder marks on an object, such as those on an encoder wheel, can be sensed as the object rotates to provide an encoder signal. However, when a radial array of encoding marks is not centered on the object's axis of rotation then the encoder signal may contain an eccentricity error.

DETAILED DESCRIPTION

Figure 1:
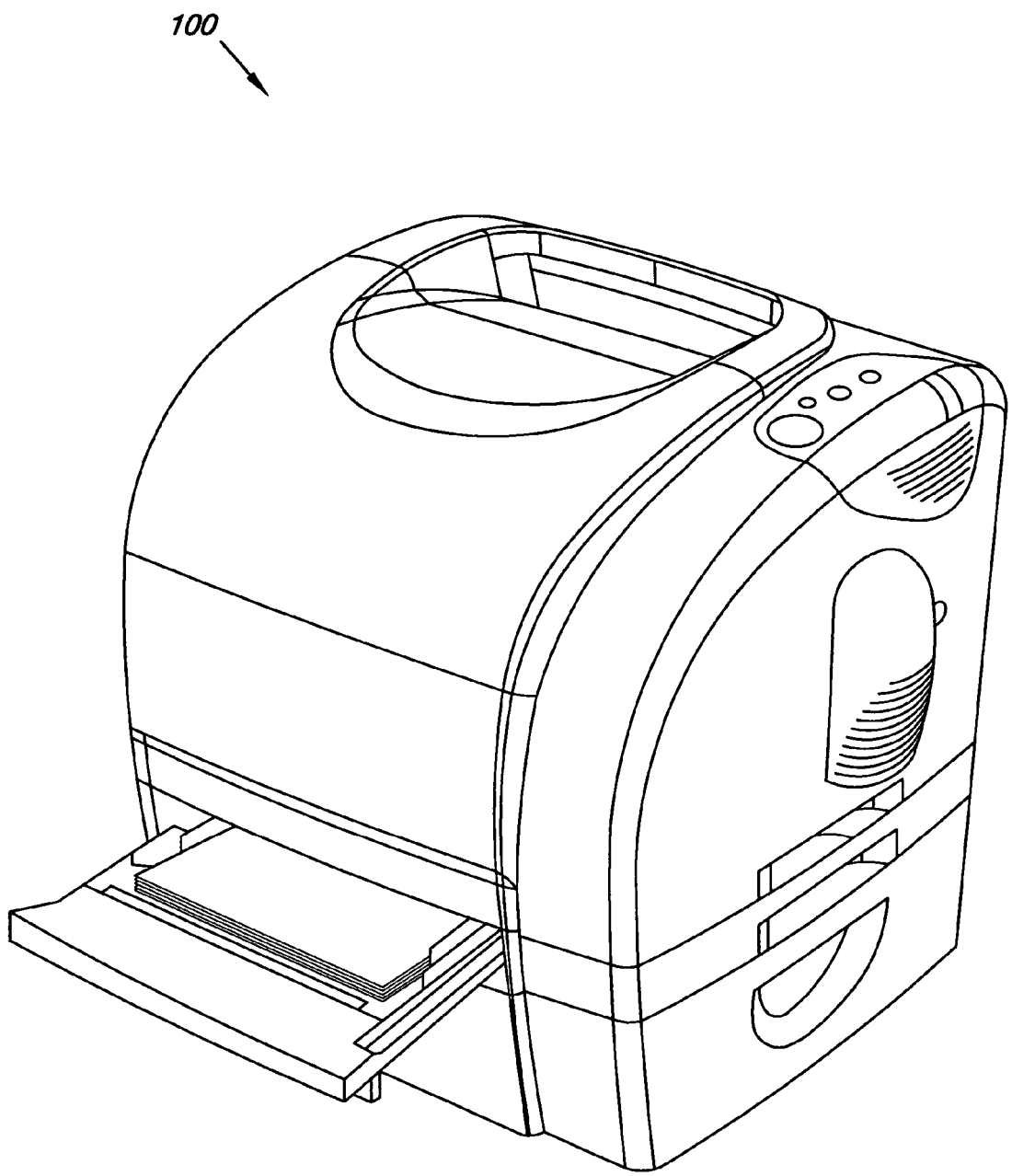
FIG. 1 illustrates an embodiment of a printing device suitable to implement an embodiment of the present disclosure.

Embodiments of the present disclosure include methods and devices, including logic operable to compensate, at least partially, for encoder wheel eccentricity by averaging signals. One method embodiment includes forming component signals based on encoder signals, averaging the component signals to form averaged signals, and generating output signals based on the averaged signals.

In one embodiment of compensating, such as at least partially compensating, for encoder wheel eccentricity, an apparatus contains two quadrature encoding modules, positioned to be diametrically opposed on a radial array of encoding marks connected to a rotating object with an angular motion to be determined. A quadrature encoding module can sense encoding marks and transmit a pair of quadrature encoder signals that contain data about the encoding marks. A pair of quadrature encoder signals includes two channels of the same signal, but with a 90 degree phase shift between the channels' signals. When two quadrature encoding modules are positioned to be diametrically opposed on a radial array, the modules are 180 degrees apart from each other on the array.

According to various embodiments, in an apparatus that contains a radial array of encoding marks connected to a rotating object but not centered on the object's axis of rotation, and two quadrature encoding modules are positioned to be diametrically opposed on the axis of rotation, positioned to sense the encoding marks as the object rotates, logic can use the data in the quadrature encoder signals transmitted by the quadrature encoding modules to determine the angular motion of the rotating object, despite the eccentricity error.

In the field of motion control, an encoding module can sense encoding marks attached to an object and transmit encoder signals that contain data about the encoding marks. Logic can use the data in the encoder signals to determine the motion of the object with respect to the encoding module. The encoder signals and information about the geometry of the encoding marks can be used by logic to calculate the position of the object. The encoder signals and time information can be used by logic to calculate the velocity and acceleration of the object.

Logic can use encoder signals to determine the angular motion of a rotating object. A radial array of encoder marks, such as those on an encoder wheel, can be connected to the rotating object, so that an encoding module can sense the encoding marks as the object rotates. In such an apparatus, it is desirable for the radial array to be centered on the axis of rotation of the rotating object, so that the angular rotation of the array equals the angular rotation of the object.

When a radial array of encoding marks is connected to a rotating object but the array is not centered on the object's axis of rotation then the angular rotation of the array does not equal the angular rotation of the object. When a single encoding module senses the encoding marks of the off-center array and transmits encoder signals based on the marks, then data in the signals contain an eccentricity error, so that logic cannot use the data to accurately determine the angular motion of the rotating object.

FIG. 1 illustrates an example of a printing device suitable to implement an embodiment of the present disclosure. FIG. 1 illustrates a printing device 100. By way of example and not by way of limitation, the printing device 100 forms on media, i.e. paper, images and characters. In different embodiments, printing on media is performed by firing ink jets and/or by use of toner and a laser. Different embodiments of printers, including ink jet and laser printers, contain rotating components, such as printer drums. For example, in the printing device of FIG. 1, media can be laid over or fed onto a rotating printer drum, so that as the printer drum rotates the media on the drum moves past printheads. As described herein, the printing device 100 can include encoding modules to sense the rotation of the printer drum and logic operable to determine the angular position, velocity, and acceleration of the printing drum. The printing device 100 can also include logic operable to transmit to a print controller signals that represent the motion of the printing drum.

Figure 2:
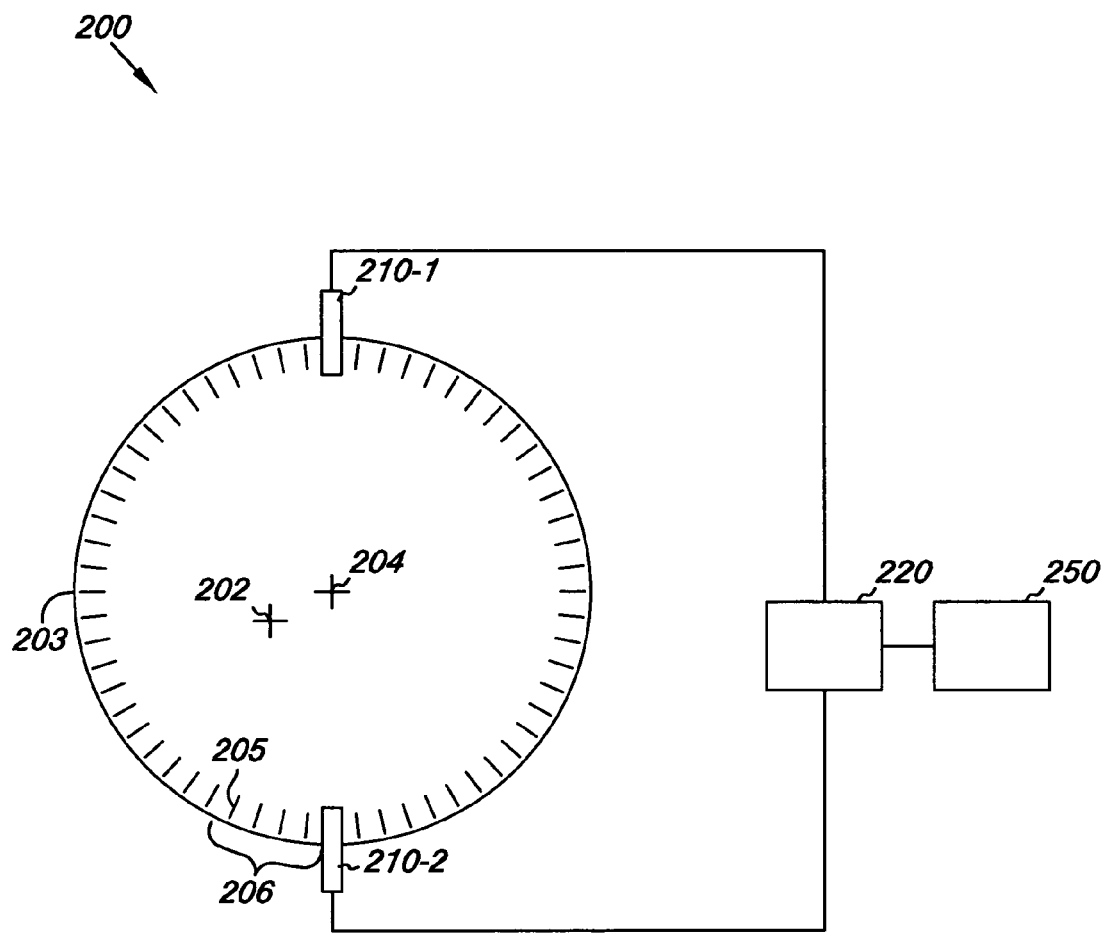
FIG. 2 shows an embodiment of an encoder wheel and an apparatus for digitally compensating for, at least partially, encoder wheel eccentricity of an embodiment of the present disclosure.

FIG. 2 shows an embodiment encoder wheel and an embodiment of an apparatus for digitally compensating, such as at least partially compensating, for encoder wheel eccentricity of an embodiment of the present disclosure. In the embodiment of FIG. 2, the embodiment of the apparatus for digitally compensating for encoder wheel eccentricity 200 is shown in relation to an encoder wheel 203.

The encoder wheel 203 includes encoder mark 205, which is part of a radial array of encoder marks 206. Individual ones of the encoder marks in the radial array of encoder marks 206 can be sensed by a quadrature encoding module. The radial array of encoder marks 206 is centered on an array center 202. The encoder wheel 203 rotates around an axis of rotation, which passes through an axis center 204. As shown, the array center 202 does not coincide with the axis center 204 as an unintended result of manufacturing techniques used to fabricate encoder wheel 203. In various embodiments, the distance between an array center and an axis center may vary. In the embodiment of FIG. 2, the distance between the array center 202 and the axis center 204 is exaggerated for illustrative purposes.

The apparatus for digitally compensating for encoder wheel eccentricity 200 contains embodiments of encoding modules, a logic module, and a controller. The embodiments of the encoding modules include a first quadrature encoding module 210-1 and a second quadrature encoding module 210-2, which are positioned to be diametrically opposed on the axis center 204. Each quadrature encoding module is capable of sensing individual ones of the encoder marks in the radial array of encoder marks 206 as the encoder wheel 203 rotates. The first quadrature encoding module 210-1 and the second quadrature encoding module 210-2 are each capable of transmitting encoder signals, such as quadrature encoder signals, based on the encoder marks they sense. Since the radial array of encoding marks 206 is not centered on the axis of rotation of the encoder wheel 203, data in the quadrature encoder signals transmitted by the quadrature encoding modules contains an eccentricity error.

The first quadrature encoding module 210-1 and the second quadrature encoding module 210-2 are each connected with a signal logic module 220, so that the signal logical module 220 can receive the quadrature encoder signals transmitted by the quadrature encoding modules. The signal logic module 220 includes logic operable to use the data in the quadrature encoder signals transmitted by the quadrature encoding modules to determine the angular motion of the encoder wheel 203, despite the eccentricity error, as described herein. The signal logic module 220 also includes logic operable to transmit output quadrature signals, which represent the angular motion of the encoder wheel 203, as described herein. The signal logic module 220 is connected with a controller 250, so that the controller 250 can receive the output quadrature signals transmitted by the signal logic module 220.

Figure 3:
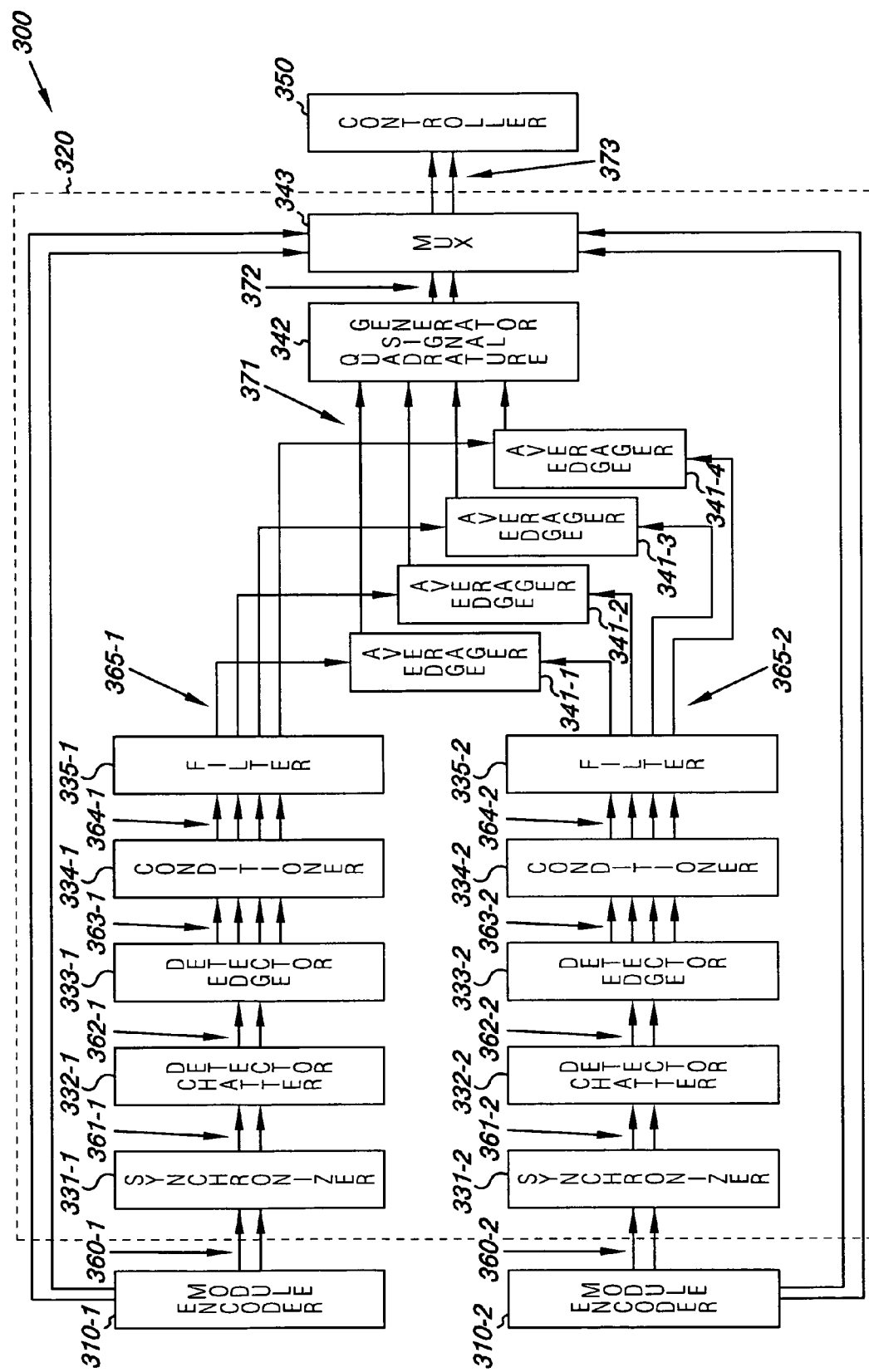
FIG. 3 shows another embodiment of the apparatus for digitally compensating for, at least partially, encoder wheel eccentricity of FIG. 2.

FIG. 3 shows another embodiment of the apparatus for digitally compensating, such as at least partially compensating, for encoder wheel eccentricity of FIG. 2. Unless explicitly stated, the method embodiments described herein are not constrained to a particular order or sequence. Additionally, some of the described method embodiments or elements thereof can occur or be performed at the same point in time. The embodiments described herein in connection with FIG. 3 can be performed by logic, hardware, application modules, or combinations of these elements, and the like, to perform the operations described herein and/or resident on the systems and devices shown herein or otherwise. Logic, suitable for performing embodiments of the present disclosure, can be resident in one or more devices or locations. Processing modules can include separate modules connected together or include several modules on an application specific integrated circuit (ASIC).

In one embodiment, the apparatus for digitally compensating for encoder wheel eccentricity forms, using signals generated by a pair of encoder modules, component signals based upon the rising edges and the falling edges of the signals from the encoder modules. Averaging, as indicated in detail later in the specification, is performed between pairs of corresponding (for example, the corresponding rising edge or corresponding falling edge component signals) component signals to form averaged signals. The averaged signals are combined to form output signals that at least partially compensate for the eccentricity of the encoder wheel as a result of the averaging.

In the embodiment of FIG. 3, an embodiment of an apparatus, such as an apparatus for digitally compensating for encoder wheel eccentricity 300, is shown including quadrature encoding modules, signal logic modules 320, and a controller 350. This can be provided as one or more ASICs. The encoding modules include a first quadrature encoding module 310-1 and a second quadrature encoding module 310-2. The first quadrature encoding module 310-1 and the second quadrature encoding module 310-2 are each capable of sensing encoder marks and transmitting quadrature encoder signals based on the marks. The first quadrature encoding module 310-1 and the second quadrature encoding module 310-2 are positioned to be diametrically opposed on an axis of rotation, around which an encoder wheel with a radial array of encoding marks rotates. (not shown in FIG. 3).

The first quadrature encoding module 310-1 and the second quadrature encoding module 310-2 are each connected with signal logic modules 320. The signal logical modules 320 of FIG. 3 represent an embodiment of the signal logic module 220 of FIG. 2. The signal logic modules 320 receive the quadrature encoder signals transmitted by the first quadrature encoding module 310-1 and the second quadrature encoding module 310-2. The signal logic modules 320 include logic operable to use the data in the quadrature encoder signals to determine an angular motion of the rotating encoder wheel, despite the presence of an eccentricity error in the data.

The first quadrature encoding module 310-1 is connected with a first synchronizer 331-1 and a multiplexer 343, so that the first synchronizer 331-1 and the multiplexer 343 can receive the quadrature encoder signals transmitted by the first quadrature encoding module 310-1. Similarly, the second quadrature encoding module 310-2 is connected with a second synchronizer 331-2 and the multiplexer 343.

The first quadrature encoding module 310-1 transmits first input quadrature encoder signals 360-1 to the first synchronizer 331-1. The second quadrature encoding module 310-2 transmits second input quadrature encoder signals to the second synchronizer 331-2. The first quadrature encoding module 310-1 and the second quadrature encoding module 310-2 also each transmit their input quadrature encoder signals to the multiplexer 343. The first synchronizer 331-1 receives the first input quadrature encoder signals 360-1 from the first quadrature encoding module 310-1. The second synchronizer 331-2 receives the second input quadrature encoder signals 360-2 from the second quadrature encoding module 310-2. The multiplexer 343 also receives the input quadrature encoder signals from the quadrature encoding modules. As shown, each of the input quadrature encoder signals is a pair of signals with two channels. In FIG. 3, the signals of the two channels are represented by two arrows.

In the embodiment shown in FIG. 3, the synchronizers include logic operable to digitally synchronize the input quadrature encoder signals they each receive. The first synchronizer 331-1 digitally synchronizes the first input quadrature encoder signals 360-1 to a digital system clock to form first synchronized input quadrature encoder signals 361-1. In the same manner, the second synchronizer 331-2 digitally synchronizes the second input quadrature encoder signals 360-2 to the digital system clock to form second synchronized input quadrature encoder signals 361-2. The first synchronizer 331-1 transmits the first synchronized input quadrature encoder signals 361-1 to a first chatter detector 332-1. The second synchronizer 331-2 transmits second synchronized input quadrature encoder signals 361-2 to a second chatter detector 332-2.

The first synchronizer 331-1 is connected with a first chatter detector 332-1, so that the first chatter detector 332-1 can receive the first synchronized input quadrature encoder signals 361-1 transmitted by the first synchronizer 331-1. Similarly, the second synchronizer 331-2 is connected with a second chatter detector 332-2, so that the second chatter detector 332-2 can receive the second synchronized input quadrature encoder signals 361-2 transmitted by the second synchronizer 331-2. Again, the synchronized input quadrature encoder signals transmitted by the synchronizers are a pair of signals with two channels, represented by two arrows.

In the embodiment shown in FIG. 3, the chatter detectors include logic operable to detect whether the synchronized input quadrature encoder signals contain chatter. Chatter includes spurious signals that can result from various sources, including mechanical vibrations. The presence of chatter in the synchronized input quadrature encoder signals of FIG. 3 could result in signals that contain excessive or erroneous data. In one embodiment, the chatter detectors can also include logic operable to reduce chatter. For example, a chatter circuit can reduce chatter by cross-clocking the synchronized input quadrature encoder signals.

As shown, the chatter detectors also include logic operable to allow the synchronized input quadrature encoder signals to pass through. The first chatter detector 332-1 allows the first synchronized input quadrature encoder signals 362-1 transmitted by the first synchronizer 331-1 to pass through as first passed synchronized input quadrature encoder signals 362-1. The second chatter detector 332-2 allows the second synchronized input quadrature encoder signals 362-2 transmitted by the second synchronizer 331-2 to pass through as second passed synchronized input quadrature encoder signals 362-1.

The first chatter detector 332-1 is connected with a first edge detector 333-1, so that the first edge detector 333-1 can receive the first passed synchronized input quadrature encoder signals 362-1 that passed through the first chatter detector 332-1. The second chatter detector 332-2 is likewise connected with a second edge detector 333-2, so that the second edge detector 333-2 can receive the second passed synchronized input quadrature encoder signals 362-2 that passed through the second chatter detector 332-2.

In the embodiment shown in FIG. 3, the edge detectors include logic operable to separate the passed synchronized input quadrature encoder signals into their component signals. A pair of quadrature encoder signals includes two channels, referred to as channel A and channel B. In this embodiment, the signals of the channels are waveforms that contain two types of edges, rising edges and falling edges. As a result, in this embodiment, the passed synchronized input quadrature encoder signals can be separated into components signals by channel and by edge type (i.e. rising or falling).

The first edge detector 333-1 separates the first passed synchronized input quadrature encoder signals 362-1 into a first four component signals 363-1. The first component signal represents a rising edge of channel A. The second component signal represents a falling edge of channel A. The third component signal represents a rising edge of channel B. The fourth component signal represents a falling edge of channel B. In the same way, the second edge detector 333-2 separates the second passed synchronized input quadrature encoder signals 362-2 into a second four component signals 363-2.

The first edge detector 333-1 transmits the first four component signals 363-1 which it separated. The second edge detector 333-2 transmits the second four component signals 363-2 which it separated. Together, the first edge detector 333-1 and the second edge detector 333-2 separate two passed synchronized input quadrature encoder signals into a total of eight component signals, which are then transmitted. In the embodiment of FIG. 3, the component signals are not in quadrature form, but are in a form that represents specific edge types from the waveforms of individual channels. In FIG. 3, each component signal is represented by an arrow.

The first edge detector 333-1 is connected with a first conditioner 334-1, so that the first conditioner 334-1 can receive the first four component signals 363-1 transmitted by the first edge detector 333-1. The second edge detector 333-2 is connected with a second conditioner 334-2, so that the second conditioner 334-2 can receive the second four component signals 363-2 transmitted by the second edge detector 333-2.

In the embodiment shown in FIG. 3, the conditioners include logic operable to allow the component signals to pass through. The first conditioner 334-1 allows the first four component signals 363-1 transmitted by the first edge detector 333-1 to pass through as a first four conditioned component signals 364-1. The second conditioner 334-2 allows the second four component signals 363-2 transmitted by the second edge detector 333-2 to pass through as a second four conditioned component signals 364-2.

In various other embodiments, the conditioners can modify the component signals as they pass through. For example, in one embodiment, the conditioners can include logic operable to impart a power up profile to the edges represented in the conditioned component signals. In some embodiments, such a power up profile can include passing component signals in a predetermined order. In the embodiment of FIG. 3, the conditioned component signals, like the component signals, are in a form that represents specific edge types from the waveforms of individual channels.

The first conditioner 334-1 is connected with a first filter 335-1, so that the first filter 335-1 can receive the first four conditioned component signals 364-1 transmitted by the first conditioner 334-1. The second conditioner 334-2 is connected with a second filter 335-2, so that the second filter 335-2 can receive the second four conditioned component 364-2 signals transmitted by second conditioner 334-2.

In the embodiment shown in FIG. 3, the filters include logic operable to allow the conditioned component signals to pass through the filters as filtered conditioned component signals. The first filter 335-1 allows the first four conditioned component signals 364-1 transmitted by the first conditioner 334-1 to pass through as a first four filtered conditioned component signals 365-1. The second filter 335-2 allows the second four conditioned component signals 364-2 transmitted by the second conditioner 334-2 to pass through as a second four filtered conditioned component signals 365-2. In various embodiments, the filters can include logic operable to perform signal filtering, such as a low band pass filter, high band pass filter, band pass filter, or combinations thereof, etc.

The first filter 335-1 and the second filter 335-2 are each connected to four edge averagers, so that the edge averagers can receive the filtered conditioned component signals passed through the filters. As shown in FIG. 3, the four edge averagers include a first edge averager 341-1, a second edge averager 341-2, a third edge averager 341-3, and a fourth edge averager 341-4. In this embodiment, each edge averager receives two filtered conditioned component signals, one from each filter.

As shown, the two filtered conditioned component signals that each edge averager receives, correspond in channel and edge type. The first edge averager 341-1 receives two filtered conditioned component signals, each representing a falling edge of channel B, one from the first filter 335-1 and one from the second filter 335-2. The second edge averager 341-2 also receives two filtered conditioned component signals, each representing a falling edge of channel A, one from the first filter 335-1 and one from the second filter 335-2. The third edge averager 341-3 also receives two filtered conditioned component signals, each representing a rising edge of channel B, one from the first filter 335-1 and one from the second filter 335-2. The fourth edge averager 341-4 also receives two filtered conditioned component signals, each representing a rising edge of channel A, one from the first filter 335-1 and one from the second filter 335-2.

In the embodiment of FIG. 3, each edge averager includes logic operable for averaging the two filtered conditioned component signals, which it receives, to form averaged signals. To perform this averaging, each edge averager utilizes corresponding edges from each of the two filtered conditioned component signals. In this embodiment, each edge averager also includes logic operable to transmit the averaged signals which it forms. As used herein, and as will be illustrated further below, an averaged signal formed and transmitted by an edge averager is not a sum of signals received that is divided by a number of signals received. Instead, according to the present disclosure, an averaged signal formed and transmitted by an edge averager is a representation of one of the filtered conditioned component signals that is received by the edge averager, transmitted with a time delay.

The edge averager determines the time delay, based on times at which it receives the filtered conditioned component signals. For example, when the edge averager receives a first filtered conditioned component signal at a first time and a second filtered conditioned component signal at a second time, the edge averager can transmit an averaged signal that represents one of the filtered conditioned component signals at a time that lies halfway between the first time and the second time. The edge averager can transmit an averaged signal with various time delays, including a time delay of zero, an average time delay, or other times to provide for a smooth change in output from the signal logic modules 320 to the controller 350, as described further below.

In one embodiment, each edge averager uses a circular queue of timers to determine when to transmit its averaged signals. The circular queue of timers is an ordered series of timer entries. Each timer entry is associated with a timer saturation constant, which is a numerical value, determined by a firmware algorithm controlling the edge averager. When the edge averager receives from a first filter a filtered conditioned component signal representing an edge of a specific channel, the timer entry begins counting up. The timer entry continues counting up until either the timer entry reaches the timer saturation constant or the edge averager receives from a second filter 335-2 a filtered conditioned component signal representing a corresponding edge of a specific channel. If the timer entry reaches the timer saturation constant then the edge averager simply allows the filtered conditioned component signal that it received to pass through (after the delay of counting up to the timer saturation constant) to a quadrature signal generator. However, if the edge averager receives the corresponding edge from the second filter 335-2, then the timer entry stops counting up. If, the edge averager then receives from the first filter 335-1 a subsequent edge (subsequent being a fixed "Nth" delay, where "N" is a portion of the queue depth), then the timer entry begins counting down at a rate that is double the rate at which the timer counted up. When the timer entry expires then the edge averager transmits an averaged signal.

In various embodiments, an encoder associated with the first filter is a leading encoder, to which a timer can be synchronized. In the embodiment shown in FIG. 3, a leading encoder can be either the first quadrature encoding module 310-1 or the second quadrature encoding module 310-2.

In this method, the first edge averager 341-1 uses a circular queue of timers to determine when to transmit an averaged signal which is part of averaged signals 371. As an example, the first edge averager 341-1 could have its time saturation constant for its timer entries programmed to be 10. The first edge averager 341-1 then receives from the first filter 335-1 a filtered conditioned component signal representing a falling edge of channel B. The next available timer entry of the timer entry queue of the first edge averager 341-1 begins counting up, and counts up to, for example, 8. The first edge averager 341-1 then receives from the second filter 335-2 a filtered conditioned component signal representing a falling edge of channel B. Since this is a corresponding edge, the timer entry stops counting up at 8. The first edge averager 341-1 then begins a process to average the two corresponding filtered conditioned component signals, to form an averaged signal, as follows. The first edge averager 341-1 then receives from the first filter 335-1 a subsequent edge in a filtered conditioned component signal representing another falling edge of channel B. Accordingly, the timer entry begins counting down at a rate that is double the rate of the first encoding module, which is the leading encoder in this example. The timer entry counts down from eight to six to four to two and then to zero whereupon the timer entry expires. Since the timer entry expires the first edge averager 341-1 then transmits to a quadrature signal generator 342 the averaged signal it formed. In this example, if the timer entry had counted up to 10 before receiving the corresponding edge, then the edge averager would have halted counting up at the saturation value of 10. The same process of waiting for a subsequent edge and starting the timer counting down at double rate until expiration would be followed. As noted above, the resulting output signal from the edge averager would not be a representation of an average of the two input signals, but would rather be a delayed version of the first input edge. This process allows for a smooth change in the output, from directly routing the input encoder signal to routing the edge averager's output, which lies halfway in between the two input signals in time.

In another embodiment of the disclosure, an edge averager includes logic operable to change its timer saturation constant. In one variation of this embodiment, the edge averager progressively increases its time saturation constant. As a result, there are progressively longer delays before output of the averaged signal that the edge averager generates and passes to a quadrature signal generator.

In an alternate variation of this embodiment, the edge averager progressively decreases its time saturation constant. As a result, there are progressively shorter delays before output of the averaged signal that the edge averager generates and passes to a quadrature signal generator. Additionally, there is a smaller window of time during which a corresponding edge can be received by the edge averager, for averaging.

In the embodiment of FIG. 3, each edge averager forms an averaged signal. The first edge averager 341-1 forms an averaged signal representing a falling edge of channel B. The second edge averager 341-2 forms an averaged signal representing a falling edge of channel A. The third edge averager 341-3 forms an averaged signal representing a rising edge of channel B. The fourth edge averager 341-4 forms an averaged signal representing a rising edge of channel A. The four averaged signals 371 are in a form that represents specific edge types from the waveforms of individual channels.

Each edge averager is connected with the quadrature signal generator 342, so that the quadrature signal generator 342 can receive averaged signals transmitted by an edge averager.

In the embodiment of FIG. 3, the quadrature signal generator 342 includes logic operable to use the four averaged signals 371 to generate averaged quadrature signals 372 and transmit the averaged quadrature signals 372 to a multiplexer 343. The average quadrature signals 372 are a pair of signals with two channels. In FIG. 3, the signals of the two channels are represented by two arrows.

The quadrature signal generator 342 is connected with the multiplexer 343, so that the multiplexer 343 can receive the averaged quadrature signals 372 from the quadrature signal generator 342. The quadrature signal generator 342 transmits the averaged quadrature signals 372 to the multiplexer 343.

In the embodiment of FIG. 3, the multiplexer 343 includes logic operable to transmit to a controller 350, the averaged quadrature signals 372 received from the quadrature signal generator 342, the quadrature encoder signals received from the first quadrature encoding module 310-1, or the quadrature encoder signals received from the second quadrature encoding module 310-2.

The signal logical modules 320 operate as a whole to transmit output quadrature signals, which accurately represent the angular motion of the rotating object. The signal logic modules 320 are connected with a controller 350, so that the controller 350 can receive the output quadrature signals transmitted by the signal logic modules 320. In one embodiment, the controller 350 can be a print controller in a printing device.

In various embodiments, the signal logic module 320 is also connected with an external control unit, so that the multiplexer 343 can receive signals transmitted by the control unit. The control unit can, in some embodiments, transmit signals to the multiplexer 343, by which the multiplexer 343 can determine which signals to transmit, as described in FIG. 4.

Figure 4:
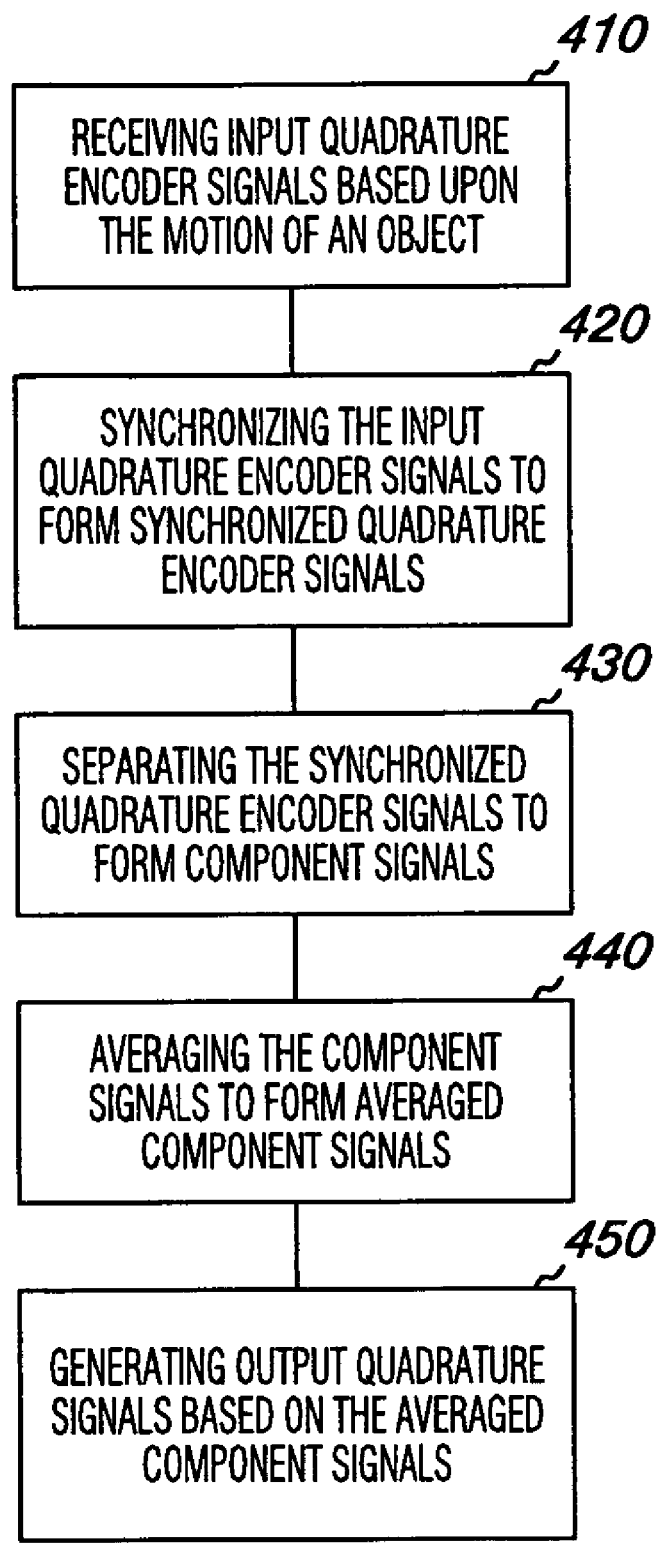
FIG. 4 shows a block diagram of an embodiment of the present disclosure.

FIG. 4 shows a block diagram of an embodiment of the present disclosure. FIG. 4 is a block diagram representing a method for digitally compensating, such as at least partially compensating, for encoder wheel eccentricity. In block 410, the method includes receiving input quadrature encoder signals. Input quadrature encoder signals of different embodiments of the present disclosure include one or more analog and/or digital signals. Encoder signals can be carried in two or more channels. Encoder signals can be received by an integrated circuit, such as an ASIC.

In block 420, the method includes synchronizing the quadrature encoder signals. Such can be performed by logic in various forms such as an integrated circuit such or an ASIC. In different embodiments of the present disclosure, the quadrature encoder signals can be synchronized such that encoder signals transmitted by different encoding modules can be synchronized to a digital system clock. The method illustrated in FIG. 4 includes synchronizing the quadrature encoder signals such that the signals are synchronized in time, synchronized in phase, or synchronized in some other manner.

In block 430, the method includes separating the synchronized quadrature encoder signals into component signals. Signals of the method of block 430 can be separated into rising and falling components, corresponding to edges of encoder markings on an encoder wheel. Thus, in one embodiment components signals of the synchronized encoder signals include a first component signal representing a falling edge of a first channel of the first quadrature encoding module, a second component signal representing a falling edge of a second channel of the first quadrature encoding module, a third component signal representing a falling edge of a first channel of the second quadrature encoding module, a fourth component signal representing a falling edge of a second channel of the second quadrature encoding module, a fifth component signal representing a rising edge of a first channel of the first quadrature encoding module, a sixth component signal representing a rising edge of a second channel of the first quadrature encoding module, a seventh component signal representing a rising edge of a first channel of the second quadrature encoding module, and a eighth component signal representing a rising edge of a second channel of the second quadrature encoding module. For example, such component signals could include encoder_1_falling_A, encoder_1_falling_B, encoder_2_falling_A, encoder_2_falling_B, encoder_1_rising_A, encoder_1_rising_B, encoder_2_rising_A, and encoder_2_rising_B.

In block 440, the method includes averaging the component signals to form averaged quadrature signals. In different embodiments, the component signals averaged include averaging like components. By way of example and not by way of limitation, the method of averaging could include averaging the component signals of encoder_1_falling_A and encoder_2_falling_A to make averaged_fallingA. Additionally, encoder_1_rising_B can be averaged with encoder_2_rising_A to make averaged_rising_B, and so on, as one of ordinary skill in the art would understand. Moreover, other combinations of component signals can be averaged in different embodiments as one of ordinary skill in the art would understand.

The averaged quadrature signals of the method of block 440 can be digital signals in different embodiments of the present disclosure. Additionally, the method of averaging like edges can include circular queues of timers that are started with an edge of a signal from one encoding module, stopped with a subsequent edge of a signal from another encoding module, and then started counting down with a double rate, synchronized to the signal from a leading encoder (i.e. the one encoding module). A leading encoder can be either a first encoding module or a second encoding module. When time on the timer expires, an average signal is output, which can include an averaged signal or a set of averaged data, or other information. The method thus described provides edge averaging capabilities spanning multiple signal edges or signal periods, enabling encoder eccentricity correction according to a chosen queue depth.

The method of block 450 includes generating an output quadrature signal based on the motion of the object. The output quadrature signal can be composed of the averaged quadrature signal, such as when the encoder wheel is not at slew, i.e. when the encoder wheel is stopped, accelerating, or decelerating. When an encoder wheel is at slew, the encoder wheel is rotating at a constant, or at least substantially constant angular velocity, e.g., steady state slew. The output quadrature signal can also be composed of one or more of the quadrature encoder signals, such as while the encoder wheel is stopped, accelerating, or decelerating. Switching in between the two can be determined by a controller and accomplished using a multiplexer. The multiplexer provides a smooth transition from one quadrature pair to the other by making the transition when the phases of the two are aligned and not at other times.

In various embodiments, the methods of the present disclosure can be performed to digitally compensate for encoder error associated with both linear and rotary motion. Furthermore, encoders of different types can also be used, in various embodiments. The methods of the present disclosure can be performed by using single channel encoders, dual channel encoders (such as quadrature encoders) or encoders with other numbers of channels.

FIGS. 5A-5D show another block diagram of an embodiment of the present disclosure. In the embodiment shown in FIGS. 5A-5D, a block diagram shows logic operable to perform a method of using a circular queue of timers in an edge averager, to determine when the edge averager transmits averaged signals.

Figure 5A:
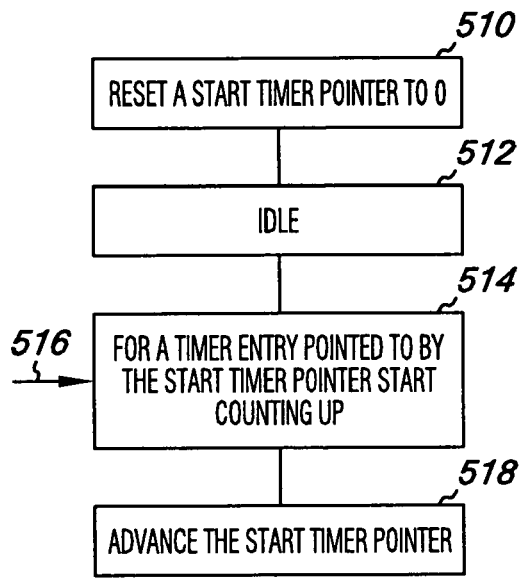
FIGS. 5A-5D show another block diagram of an embodiment of the present disclosure.

FIG. 5A illustrates logic operable to start a timer entry counting up. As shown at block 510, the method includes resetting a start timer pointer to a value of zero. In this embodiment, the start timer pointer points to a particular timer entry to start counting up. In block 512, the method includes idling or waiting for a signal to be received. At block 514, the method includes starting to count up, a timer entry pointed to by the start timer pointer. The method starts counting up when the edge averager receives a filtered conditioned component signal 516 from a first filter. As shown at block 518, the method also includes advancing the value of the start timer pointer.

Figure 5B:
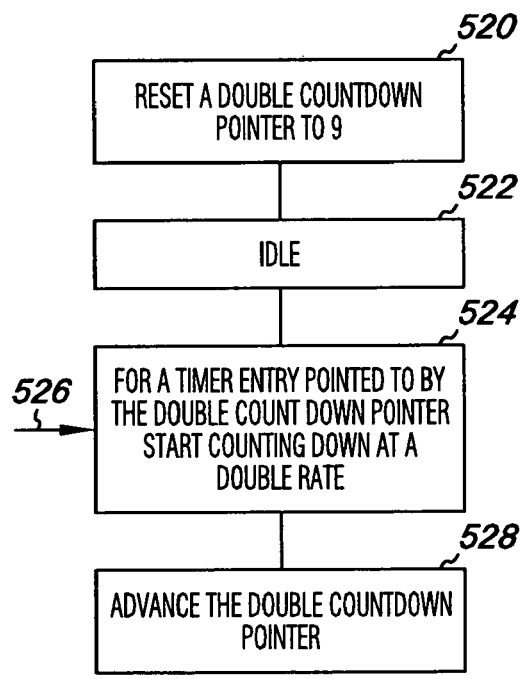

FIG. 5B illustrates logic operable to start the timer entry counting down at a double rate. In block 520, the method includes resetting a double countdown pointer to a value of nine. In this embodiment, the double countdown pointer points to a particular timer entry to start double counting down. As shown in block 522, the method includes idling. As shown in block 524, the method includes starting to count down at twice the rate that a first encoding module is counting. The method starts double counting down when the edge averager receives a subsequent filtered conditioned component signal 526 from the first filter. At block 528, the method also includes advancing the value of the double countdown pointer.

Figure 5C:
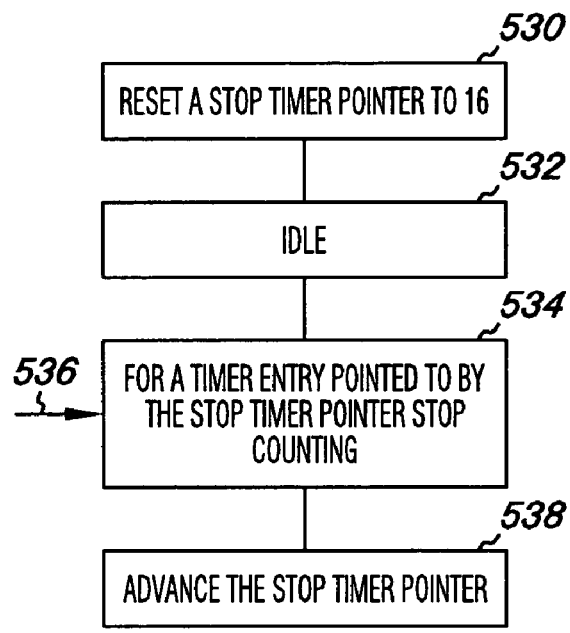

FIG. 5C illustrates logic operable to stop the timer entry from counting. As shown at block 530, the method includes resetting a stop timer pointer to a value of sixteen. In this embodiment, the stop timer pointer points to a particular timer entry to stop from counting. In block 532, the method includes idling. At block 534, the method includes stopping the timer entry from counting. The method stops the timer entry from counting when the edge averager receives a filtered conditioned component signal 536 from a second filter, which corresponds to the filtered conditioned component signal 516 from the first filter. As shown at block 538, the method also includes advancing the value of the stop count pointer.

Figure 5D:
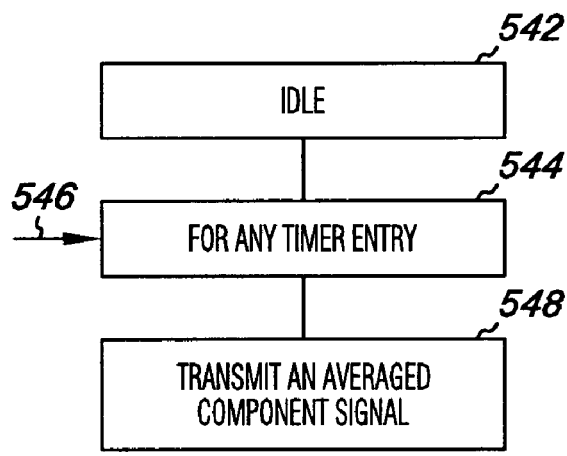

FIG. 5D illustrates logic operable to transmit an averaged signal. At block 542, the method includes idling. In block 544, the method includes receiving a signal 546 for any timer entry. As shown at block 528, the method also includes transmitting an averaged signal. The method transmits the averaged signal when any timer entry expires.

In the embodiment shown in FIG. 5, when any timer entry expires by counting down to zero the edge averager transmits an averaged signal, as described in FIG. 3. In various embodiments, the pointers can reset to different values. In other embodiments, part or all of the functions in each set of blocks can be looped. For example, a loop can be implemented in which after a pointer is advanced, logic loops back to idling, and remains there until the edge averager receives a particular signal. Other operable logic can also be added, in some embodiments, to avoid potential difficulties in the timer entry counting. For example, logic can be added operable to prevent logic to avoid attempting to stop a timer entry that has not started counting or that is in the process of starting to count. This other operable logic may be included in other embodiments, but performing a method of using a circular queue of timers in an edge averager could be accomplished without its use.

The embodiments described herein can be performed by logic, hardware, application modules, and the like, to perform the operations described herein and/or resident on the systems and devices shown herein or otherwise. Logic, suitable for carrying out embodiments of the present disclosure, can be resident in one or more devices or locations. Processing modules can include separate modules connected together or include several modules on an application specific integrated circuit (ASIC).

Although specific embodiments have been illustrated and described herein, those of ordinary skill in the art will appreciate that an arrangement calculated to achieve the same techniques can be substituted for the specific embodiments shown. This disclosure is intended to cover all adaptations or variations of various embodiments of the present disclosure.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method comprising:
receiving encoder signals based on motion of an object;
forming component signals based on the encoder signals;
averaging the component signals to form averaged signals;
generating output signals based on the averaged signals when the object is rotating at constant angular velocity;
generating output signals based on a single encoding module when the object is not rotating at a constant angular velocity; and
transitioning between generating the output signals based on the averaged signals and generating the output signals based on the single encoding module by changing a timer saturation constant in the timer.

2. The method of claim 1, wherein:
the method includes receiving quadrature encoder signals based on motion of the object;
forming the component signals includes forming component signals based on the quadrature encoder signals; and
generating the output signals includes generating output quadrature signals based on the averaged signals.

3. The method of claim 1, wherein the method includes imparting a power-up phase profile to edges of the component signals.

4. The method of claim 1, wherein:
the method includes receiving first encoder signals associated with a first encoding module and second encoder signals associated with a second encoding module; and
forming the component signals includes forming component signals based on the first encoder signals and the second encoder signals.

5. The method of claim 4, wherein:
the method includes synchronizing the first encoder signals and the second encoder signals to form synchronized signals; and
forming the component signals includes separating the synchronized signals by channel and by edge type.

6. The method of claim 1, wherein averaging the component signals to form the averaged signals includes using a timer, in a circular queue of timers, that starts counting forward at a first rate upon receipt of a first edge of a first type from a first encoding module, stops counting upon receipt of a second edge of the first type from a second encoding module, and starts counting backward at a rate twice as fast as the first rate upon receipt of a third edge, subsequent to the first edge, of the first type from the first encoding module.

7. The method of claim 1, wherein the method includes transitioning from generating the output signals based on the averaged signals to generating the output signals based on the single encoding module by decreasing the timer saturation constant.

8. The method of claim 1, wherein the method includes transitioning from generating the output signals based on the single encoding module to generating the output signals based on the averaged signals by increasing the timer saturation constant.

9. A method, comprising:
forming component signals based on encoder signals;
averaging the component signals to form averaged signals; and
generating output signals based on the averaged signals,
wherein the method includes receiving first encoder signals associated with a first encoding module and second encoder signals associated with a second encoding module; and forming the component signals includes forming component signals based on the first encoder signals and the second encoder signals,
wherein the method includes synchronizing the first encoder signals and the second encoder signals to form synchronized signals; and forming the component signals includes separating the synchronized signals by channel and by edge type,
wherein separating the synchronized signals by channel and by edge type includes separating synchronized quadrature encoder signals to form:
a first component signal representing a falling edge of a first channel of a first quadrature encoding module;
a second component signal representing a falling edge of a second channel of the first quadrature encoding module;
a third component signal representing a falling edge of a first channel of a second quadrature encoding module;
a fourth component signal representing a falling edge of a second channel of the second quadrature encoding module;
a fifth component signal representing a rising edge of a first channel of the first quadrature encoding module;
a sixth component signal representing a rising edge of a second channel of the first quadrature encoding module;
a seventh component signal representing a rising edge of a first channel of the second quadrature encoding module; and
an eighth component signal representing a rising edge of a second channel of the second quadrature encoding module.

10. A method, comprising:
receiving encoder signals based on motion of an object;
forming component signals based on the encoder signals;
averaging component signals to form averaged signals; and
generating output signals based on the averaged signals,
wherein the method includes selecting the encoder signals based on a single encoding module as the output signals when the object is not rotating at a constant angular velocity.

11. A method, comprising:
receiving encoder signals based on motion of an object;
forming component signals based on the encoder signals;
averaging the component signals to form averaged signals; and
generating output signals based on the averaged signals,
wherein the method includes selecting the averaged signals as the output signals when the object is rotating at a constant angular velocity.

12. A device, comprising:
encoding modules positioned to sense an array of encoder marks on an encoder wheel; and
logic operable to receive encoder signals transmitted by the encoding modules, to separate the encoder signals into component signals, and to average the component signals to form averaged signals,
wherein the logic, when the encoder wheel is rotating at a constant angular velocity, is operable to synchronize the encoder signals received from the encoding modules,
wherein the logic is operable to route signals transmitted by a first encoding module to a multiplexer when the encoder wheel is not rotating at a constant angular velocity.

13. The device of claim 12, wherein the logic includes a circular queue of timers, wherein a timer of the circular queue:
includes a configuration to count forward at a forward rate upon a first encoding module sensing an edge of a first type of an encoder mark on the encoder wheel;
includes a configuration to stop upon a second encoding module sensing an edge of the first type of an encoder mark on the encoder wheel; and
includes a configuration to count backward at twice the forward rate upon the first encoding module sensing a subsequent edge of the first type.

14. The device of claim 13, wherein the logic is operable to transmit averaged signals when the timer expires.

15. The device of claim 12, wherein the encoder wheel is located on a printer drum.

16. The device of claim 12, wherein the device is included in a printer.

17. A method for compensating for encoder wheel eccentricity, comprising:
routing encoding module signals to a signal logic module when an encoder wheel is not at slew; and
averaging the encoding module signals, by using the signal logic module, to form averaged signals, when the encoder wheel is at slew; and
generating an output signal from the averaged signals and the encoding module signals, by using the signal logic module.

18. The method of claim 17, wherein averaging the encoding module signals includes:
digitally synchronizing the encoding module signals;
separating the encoding module signals into component signals; and averaging the component signals.

19. The method of claim 18, wherein averaging the component signals includes starting a circular queue timer counting in a first direction when an edge of the first type on the encoder wheel is sensed by a first encoding module, stopping the timer, when an edge of the first type on the encoder wheel is sensed by a second encoding module, and starting the timer counting in a direction opposite the first direction at a double rate, synchronized to the first encoding module, when a subsequent edge of the first type on the encoder wheel is sensed by the first encoding module.

20. A device, comprising;
an encoder wheel;
a pair of encoder wheel modules associated with the encoder wheel; and
means for digitally correcting eccentricity error associated with the encoder wheel including means for:

synchronizing encoding module signals output by the encoder wheel modules;

separating the encoding module signals into component signals;

averaging the component signals to form averaged signals; and generating an output signal with the encoding module signals when the encoder wheel is not rotating at a constant angular velocity, and generating an output signal with the averaged signals when the encoder wheel is rotating at a constant angular velocity.

21. The device of claim 20, wherein the means includes means for:

starting a circular queue timer counting forward when an edge of a first type on the encoder wheel is sensed by a first encoding module;

stopping the timer, when an edge of the first type on the encoder wheel is sensed by a second encoding module; and starting the timer counting in reverse at a double rate, synchronized to the first encoding module, when a subsequent edge of the first type on the encoder wheel is sensed by the first encoding module.

* * * * *

UNITED STATES PATENT AND TRADEMARK OFFICE
CERTIFICATE OF CORRECTION

PATENT NO. : 7,456,386 B2  Page 1 of 1
APPLICATION NO. : 11/242313
DATED : November 25, 2008
INVENTOR(S) : David A. Rehmann It is certified that error appears in the above-identified patent and that said Letters Patent is hereby corrected as shown below:

In column 12, line 24, in Claim 1, after "method" insert -- , --.

In column 12, line 29, in Claim 1, after "at" insert -- a --.

In column 13, line 55, in Claim 10, after "averaging" insert -- the --.

Signed and Sealed this

Eleventh Day of August, 2009

David J. Kappos
*Director of the United States Patent and Trademark Office*